United States Patent
Iwayama et al.

(10) Patent No.: US 7,796,818 B2
(45) Date of Patent: Sep. 14, 2010

(54) FREEHAND INPUT METHOD, FREEHAND INPUT DEVICE, AND COMPUTER PROGRAM PRODUCT

(75) Inventors: Naomi Iwayama, Kawasaki (JP); Katsuhiko Akiyama, Kawasaki (JP); Kenji Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 11/595,885

(22) Filed: Nov. 13, 2006

(65) Prior Publication Data

US 2008/0019591 A1    Jan. 24, 2008

(30) Foreign Application Priority Data

Jul. 19, 2006   (JP) ............................. 2006-197408

(51) Int. Cl.
*G06K 9/00* (2006.01)
(52) U.S. Cl. ..................... 382/187; 382/312; 382/189
(58) Field of Classification Search ................ 382/382, 382/189, 186, 187
See application file for complete search history.

(56) References Cited

U.S. PATENT DOCUMENTS 5,781,662 A * 7/1998 Mori et al. .................. 382/189
5,864,635 A * 1/1999 Zetts et al. .................. 382/187
2003/0185444 A1 * 10/2003 Honda ........................ 382/186
2005/0275638 A1   12/2005 Kolmykov-Zotov et al. . 345/179

FOREIGN PATENT DOCUMENTS

| CN | 1437136 A | 8/2003 |
|---|---|---|
| JP | 8-6706 | 1/1996 |
| JP | 8-212299 | 8/1996 |

OTHER PUBLICATIONS

Chinese Office Action issued on Oct. 24, 2008 corresponding to No. 200610144637.3 with Certification.

* cited by examiner

*Primary Examiner*—Samir A. Ahmed
*Assistant Examiner*—Ruiping Li
(74) *Attorney, Agent, or Firm*—Kratz, Quintos & Hanson, LLP

(57) ABSTRACT

Execution commands corresponding to the type of gesture are stored and by acquiring coordinate values of accepted handwriting input including gesture on a display screen, handwriting is displayed. When handwriting input is accepted, display data of handwriting is updated. When handwriting input is not completed, it is decided whether or not handwriting input is gesture input. When it is decided that the handwriting input is gesture input, the type of gesture is decided on the basis of the coordinate values of gesture on the display screen, an execution command corresponding to the type of gesture is read and the fact that the handwriting input is gesture input is displayed. When gesture input is completed, the execution command corresponding to gesture input is executed. Therefore, the user can make handwriting input according to the user's intent without performing mode switching.

18 Claims, 10 Drawing Sheets

FIG. 3

| HANDWRITING ID | PEN-DOWN POSITION | | PEN-UP POSITION |
|---|---|---|---|
| xxx | (xxx,xxx) | (xxx,xxx),......,(xxx,xxx) | (xxx,xxx) |
| ..... | ..... | ..... | ..... |

141

FREEHAND INPUT METHOD, FREEHAND INPUT DEVICE, AND COMPUTER PROGRAM PRODUCT

CROSS-REFERENCE TO RELATED APPLICATIONS

This Nonprovisional application claims priority under 35 U.S.C.§119(a) on Patent Application No. 2006-197408 filed in Japan on Jul. 19, 2006, the entire contents of which are hereby incorporated by reference.

BACKGROUND OF THE INVENTION

1. Field of the Invention

The present invention relates to a freehand input method capable of inputting in an input region on a display screen of computer in handwriting by use of a pen-type input device such as a stylus pen and a pen-type tablet or a pointing device such as a mouse, a freehand input device for achieving such method and a computer program product for achieving general purpose computers as such device.

2. Description of Related Art

Many freehand input devices for inputting freehand characters on the display screen of computer by use of a pen-type input device such as a stylus pen and a pen-type tablet have been developed. To distinguish handwriting input from command input, many conventional freehand input devices has a configuration of switching an input mode, for example, by selection of a button. Thus, in such conventional freehand input devices, when handwriting on the display screen is deleted, it is necessary to select a button for executing a command to perform switching to a deletion mode and then make an operation such as moving a pen on a handwriting input to be deleted. That is, in the conventional freehand input devices, when handwriting on the display screen is deleted, operations in two steps are necessary. Furthermore, in the conventional freehand input devices, a button region in which buttons such as the above-mentioned button are disposed, is generally provided at an end or peripheral portion of the screen. For this reason, when handwriting input is made at a region remote from the button region, to select a button to execute a command, a pen inconveniently needs to be moved largely.

In consideration of the above-mentioned circumstances, according to a known method, when handwriting input which meets a predetermined condition is accepted, by deciding that handwriting input is gesture input, not handwriting input and executing a command stored in accordance to the inputted gesture, handwriting input can be distinguished from command input without switching the input mode by the user. According to this method, however, handwriting which meets a predetermined condition for deciding as gesture input cannot be input as normal handwriting. Accordingly, even when the user wants to input as handwriting, not gesture, the input can be possibly decided as gesture input despite the user's intent and thus, handwriting input intended by the user cannot be made. Therefore, a method capable of distinguishing handwriting input from gesture input according to the user's intent is disclosed in, for example, Japanese Patent Application Laid-Open No. 08-006706 (1996).

According to the method disclosed in the above-mentioned Japanese Patent Application Laid-Open No. 08-006706 (1996), when handwriting input made by the user meets a predetermined condition, the handwriting input is deleted and decided as gesture. A predetermined sign stored in accordance to the decided gesture is displayed. However, when the predetermined sign thus displayed is not selected by the user, handwriting input already deleted is displayed again.

However, in the above-mentioned freehand input device, it is decided whether or not the input is handwriting input at the time when inputting is completed. Thus, since the user cannot confirm whether handwriting input is decided as handwriting input or gesture input until inputting is completed, there is a possibility that the input is decided as gesture input despite the user's intent. For example, in the case where the device is configured so as to decide that the input is gesture input when a filling region is detected, there is a possibility that the filling region which can be decided as filling region by the device cannot be inputted in freehand sufficiently. In such case, there is a possibility that the input is not decided as gesture input and the device accepts handwriting during filling input as handwriting input. To allow the device to certainly decide the input as gesture input, the user must make filling input more than necessary and thus, it is difficult to make handwriting input according to the user's intent.

BRIEF SUMMARY OF THE INVENTION

In consideration of these circumstances, an object of the present invention is to provide a freehand input method capable of make freehand input according to the user's intent without switching the mode by certainly deciding whether input is handwriting input or gesture input during handwriting input. Another object of the present invention is to provide a freehand input device for achieving the freehand input method and a computer program product for allowing general purpose computer to function as the freehand input device.

To achieve the above-mentioned objects, a first aspect of a freehand input method according to the present invention is a method for making freehand input using a freehand input device which comprises: a table for storing execution commands corresponding to the type of gesture therein; a display unit having a display screen; a handwriting input unit for accepting handwriting input including gesture input; and a coordinate value acquisition unit for acquiring coordinate values of the handwriting input accepted by the handwriting input unit; and displays handwriting corresponding to handwriting input including gesture accepted by the handwriting input, and is characterized by comprising the steps of: deciding whether or not the handwriting input unit is accepting handwriting input; updating display data of handwriting when it is decided that the handwriting input unit is accepting handwriting input; deciding whether or not acceptance of handwriting input is completed; deciding whether or not the handwriting input is gesture input when it is decided that acceptance of handwriting input is not completed; deciding the type of gesture on the basis of the coordinate values acquired by the coordinate value acquisition unit when it is decided that the handwriting input is gesture input; reading an execution command corresponding to the decided type of gesture from the table; displaying on the display unit the fact that the input is gesture input; deciding whether or not gesture input is completed; and executing the execution command corresponding to the gesture input when it is decided that gesture input is completed.

A second aspect of the freehand input method according to the present invention is, in the method of first aspect, characterized by further comprising the steps of: deciding whether or not coordinate values acquired by the coordinate value acquisition unit are constant; deciding whether or not the state where it is decided that the coordinate values are constant continues for a predetermined time when input is decided as gesture input; changing decision result to the result that the input is not gesture input when it is decided the predetermined time is elapsed; and updating display on the display screen of the display unit to display showing the fact that the input is not gesture input.

A third aspect of the freehand input method according to the present invention is, in the method of first aspect, characterized by further comprising the steps of displaying a predetermined icon in the vicinity of position where gesture was inputted on the display screen of the display unit when the input is decided as gesture input and it is decided that gesture input is completed; deciding whether or not the icon displayed on the display screen of the display unit is selected; changing decision result to the result that the input is not gesture input when it is decided that the icon displayed on the display screen of the display unit is selected; and updating display on the display screen of the display unit to display showing the fact that the input is not gesture input.

A fourth aspect of the freehand input method according to the present invention is, in the method of any one of the first to third aspect, characterized in that handwriting corresponding to handwriting input decided as gesture is turned on and off on the display screen of the display unit.

A fifth aspect of the freehand input method according to the present invention is, in the method of the fourth aspect, characterized in that a cycle of turning on and off of handwriting corresponding to handwriting input decided as gesture on the display screen of the display unit is changed depending on the decided type of gesture.

A sixth aspect of the freehand input method according to the present invention is, in the method of any one of the first to third aspect, characterized in that handwriting corresponding to handwriting input decided as gesture is displayed on the display screen of the display unit in a color other than the color of the handwriting input decided as non-gesture input.

A seventh aspect of the freehand input method according to the present invention is, in the method of the sixth aspect, characterized in that display color of handwriting corresponding to handwriting input decided as gesture on the display screen of the display unit is changed depending on the decided type of gesture.

An eighth aspect of the freehand input method according to the present invention is, in the method of any one of the first to third aspect, characterized in that text data representing that input is decided as gesture input is displayed in the vicinity of display position of handwriting corresponding to handwriting input decided as gesture on the display screen of the display unit.

A ninth aspect of the freehand input method according to the present invention is, in the method of the eighth aspect, characterized in that the text data is changed depending on the decided type of gesture.

A tenth aspect of the freehand input method according to the present invention is, in the method of any one of the first to third aspect, characterized in that an icon representing that input is decided as gesture input is displayed in the vicinity of display position of handwriting corresponding to handwriting input decided as gesture on the display screen of the display unit.

An eleventh aspect of the freehand input method according to the present invention is, in the method of the tenth aspect, characterized in that the icon is changed depending on the decided type of gesture.

A twelfth aspect of the freehand input method according to the present invention is, in the method of any one of the first to third aspect, characterized in that a cursor for instructing handwriting corresponding to handwriting input decided as gesture on the display screen of the display unit is changed so as to have different shape of a cursor in the case of the input decided as non-gesture input.

A thirteenth aspect of the freehand input method according to the present invention is, in the method of the twelfth aspect, characterized in that pattern of the cursor is changed depending on the decided type of gesture.

Also, to achieve the above-mentioned objects, a first aspect of a freehand input device according to the present invention is a freehand input device which comprises: storing means for storing execution commands corresponding to the type of gesture; displaying means having a display screen; freehand inputting means for accepting handwriting input including gesture input; and coordinate value acquiring means for acquiring coordinate values of handwriting input accepted by the freehand inputting means; and displays handwriting corresponding to handwriting input including gesture accepted by the freehand inputting means, and is characterized by comprising: first deciding means for deciding whether or not the freehand inputting means is accepting handwriting input; handwriting display updating means for updating display data of handwriting when the first deciding means decides that the freehand inputting means is accepting handwriting input; second deciding means for deciding whether or not acceptance of handwriting input is completed; third deciding means for deciding whether or not the handwriting input is gesture input when the second deciding means decides that acceptance of handwriting input is not completed; deciding means for deciding the type of gesture on the basis of the coordinate values acquired by the coordinate value acquiring means when the third deciding means decides the handwriting input is gesture input; means for reading an execution command corresponding to the type of gesture decided by the deciding means; gesture decision displaying means for displaying the fact that the handwriting input is gesture input on the display screen of the displaying means thereon; and fourth deciding means for deciding whether or not gesture input is completed; wherein the execution command corresponding to the gesture input is executed when the third deciding means decides that gesture input is completed.

A second aspect of the freehand input device according to the present invention is, in the device of the first aspect, characterized by further comprising: coordinate value deciding means for deciding whether or not coordinate values acquired by the coordinate value acquiring means are constant; and fifth deciding means for deciding whether or not the state where the coordinate value deciding means decides that the coordinate values are constant continues for a predetermined time when the third deciding means decides that the handwriting input is gesture input; wherein the third deciding means changes decision result to the result that the handwriting input is not gesture input when the fifth deciding means decides that the predetermined time is elapsed, and the gesture decision displaying means updates display on the display screen of the displaying means to display showing that the handwriting input is decided as non-gesture input.

A third aspect of the freehand input device according to the present invention is, in the device of the first aspect, characterized by further comprising: icon displaying means for displaying a predetermined icon in the vicinity of position where gesture is inputted on the display screen of the displaying means when the third deciding means decides that handwriting input is decided as gesture input and the fourth deciding means decides that gesture input is completed; and sixth deciding means decides whether or not the icon displayed by the icon displaying means is selected; wherein the third deciding means changes decision result to the result that handwriting input is not gesture input when the sixth deciding means decides that the icon is selected, and the gesture decision displaying means updates display on the display screen of the displaying means to display showing that the handwriting input is not gesture input.

Furthermore to achieve the above-mentioned objects, a first aspect of a computer program product according to the present invention is a computer program product for controlling a computer which is connected to: a table for storing execution commands corresponding to the type of gesture; a display unit having a display screen; and a freehand input unit for accepting handwriting input including gesture input, and displays handwriting corresponding to handwriting input including gesture accepted by the handwriting input unit by acquiring coordinate values of handwriting input accepted by the handwriting input unit, and is characterized in that the computer program product comprises: a computer readable storage medium having computer readable program code means embodied in the medium, the computer readable program code means comprising computer instruction means for: deciding whether or not the handwriting input unit is accepting handwriting input; updating display data of handwriting when it is decided that the handwriting input unit is accepting handwriting input; deciding whether or not acceptance of handwriting input is completed; deciding whether or not the handwriting input is gesture input when it is decided that acceptance of handwriting input is not completed; deciding the type of gesture on the basis of coordinate values on the display screen of the display unit when it is decided that the handwriting input is gesture input; reading an execution command corresponding to the decided type of gesture from the table; displaying the fact that the handwriting input is gesture input on the display screen of the display unit; deciding whether or not gesture input is completed; and executing the execution command corresponding to the gesture input when it is decided that gesture input is completed.

A second aspect of the computer program product according to the present invention is, in the computer program product of the first aspect, characterized in that the computer readable program code means further comprises computer instruction means for: deciding whether or not coordinate values of gesture on the display screen of the display unit are constant; deciding whether or not the state where coordinate values are constant continues for a predetermined time when it is decided that the handwriting input is gesture input; changing decision result to the result that handwriting input is not gesture input when it is decided that the predetermined time is elapsed; and updating display on the display screen of the displaying means to display showing that the handwriting input is not gesture input.

A third aspect of the computer program product according to the present invention is, in the computer program product of the first aspect, characterized in that the computer readable program code means further comprises computer instruction means for: displaying a predetermined icon in the vicinity of position where gesture is inputted on the display screen of the displaying means when handwriting input is decided as gesture input and it is decided that gesture input is completed; deciding whether or not the icon displayed on the display screen of the display unit is selected; changing decision result to the result that handwriting input is not gesture input when it is decided that the icon displayed of the display screen of the display unit is selected; and updating display on the display screen on the display unit to display showing that the handwriting input is not gesture input.

In the first aspect of the freehand input method, freehand input device and computer program product according to the present invention, an execution command corresponding to the type of gesture is stored and coordinate values of accepted handwriting input including gesture on the display screen are acquired to display handwriting. It is decided whether or not handwriting input is being accepted and when it is decided that handwriting input is being accepted, display state of handwriting is updated. It is decided whether or not acceptance of handwriting input is completed and when it is decided that acceptance is not completed, it is decided whether or not handwriting input is gesture input. When it is decided that handwriting input is gesture input, the type of gesture is decided on the basis of coordinate values of the gesture on the display screen, an execution command corresponding to the type of decided gesture is read and the fact that handwriting input is gesture input is displayed. It is decided whether or not gesture input is completed and when it is decided that gesture input is completed, an execution command corresponding to the input gesture is executed. Thus, since the fact that handwriting input is decided as gesture input is displayed even before gesture input is completed, the user can confirm whether or not handwriting input is decided as gesture input. Accordingly, the user can execute the command stored in accordance to gesture without continuing unnecessary gesture input.

In the second aspect of the freehand input method, freehand input device and computer program product according to the present invention, when it is decided that the coordinate values of gesture input on the display screen are constant while handwriting input is decided as gesture input, that is, handwriting input is not made, it is decided whether or not a predetermined time is elapsed until it is decided that gesture input is completed. When it is decided that the predetermined time is elapsed, the decision result that the input is gesture input is changed to non-gesture input and display state is updated to the state showing that the input is decided as non-gesture input. Thus, when the user makes handwriting input assigned to gesture, the handwriting input is decided as gesture. However, by leaving the handwriting input unupdated for a predetermined time after the user confirm display showing that handwriting input is gesture input, the user can control so as not to execute the command corresponding to the decided gesture. For example, when the user inputs a sign "x" over a character inputted by handwriting as gesture, thereby enabling deletion of display data of handwriting input crossing updated display or the handwriting sign "x" by a command, the user may leave to stand for the predetermined time in the state where color display of the sign "x" is updated. Such operation by the user enables the sign "x" to be accepted as handwriting input without deleting handwriting input.

In the third aspect of the freehand input method, freehand input device and computer program product according to the present invention, when handwriting input is decided as gesture input and it is decided that gesture input is completed, a predetermined icon is displayed in the vicinity of the position on the display screen where gesture is inputted. When the displayed icon is selected, the decision result is changed to the result of non-gesture input and accordingly, the display state is updated to a display showing the fact that the input is decided as non-gesture input. Thus, by selecting the icon, even after gesture input is completed, the decision of gesture can be easily cancelled by the user. In this case, the user can display handwriting input decided as gesture input on the display screen again without executing the command corresponding to gesture.

In the fourth and fifth aspects of the freehand input method according to the present invention, when the handwriting input is decided as gesture input, display data corresponding to the handwriting input decided as gesture input is turned on and off. It is preferred that time interval of turning on and off of the display data corresponding to the handwriting input decided as gesture input is changed depending on the decided type of gesture.

In the sixth and seventh aspects of the freehand input method according to the present invention, when handwriting input is decided as gesture input, color of display data corresponding to handwriting input decided as gesture input is changed. It is preferred that the color of the display data corresponding to the handwriting input decided as gesture input is changed depending on the decided type of the gesture.

In the eighth aspect of the freehand input method according to the present invention, text data showing that handwriting input is decided as gesture input is displayed in the vicinity of position where display data corresponding to the handwriting input decided as gesture input is displayed. As a matter of course, it is preferred that the displayed text data is changed depending on the decided type of gesture.

In addition, an icon representing the fact that handwriting input is decided as gesture input may be displayed in the vicinity of position where display data corresponding to the handwriting input decided as gesture input is displayed. Shape of a cursor displayed to instruct display data corresponding to the handwriting input decided as gesture input may be changed. Furthermore, in each case, needless to say, it is preferred that display is changed depending on the decided type of gesture.

As described above, according to the present invention, the user can visually decide that gesture is inputted with sure. Therefore, by continuing handwriting input or completing gesture input according to the user's intent, handwriting input can be performed according to the user's intent without using a mode switching button.

The above and further objects and features of the invention will more fully be apparent from the following detailed description with accompanying drawings.

BRIEF DESCRIPTION OF THE SEVERAL VIEWS OF THE DRAWINGS

FIG. 3 is a schematic view showing an example of handwriting input information stored in a storage unit of the freehand input device in accordance with the first embodiment of the present invention;

DETAILED DESCRIPTION OF THE PRESENT INVENTION

Hereinafter, the present invention will be described with reference to figures showing embodiments.

First Embodiment

Figure 1:
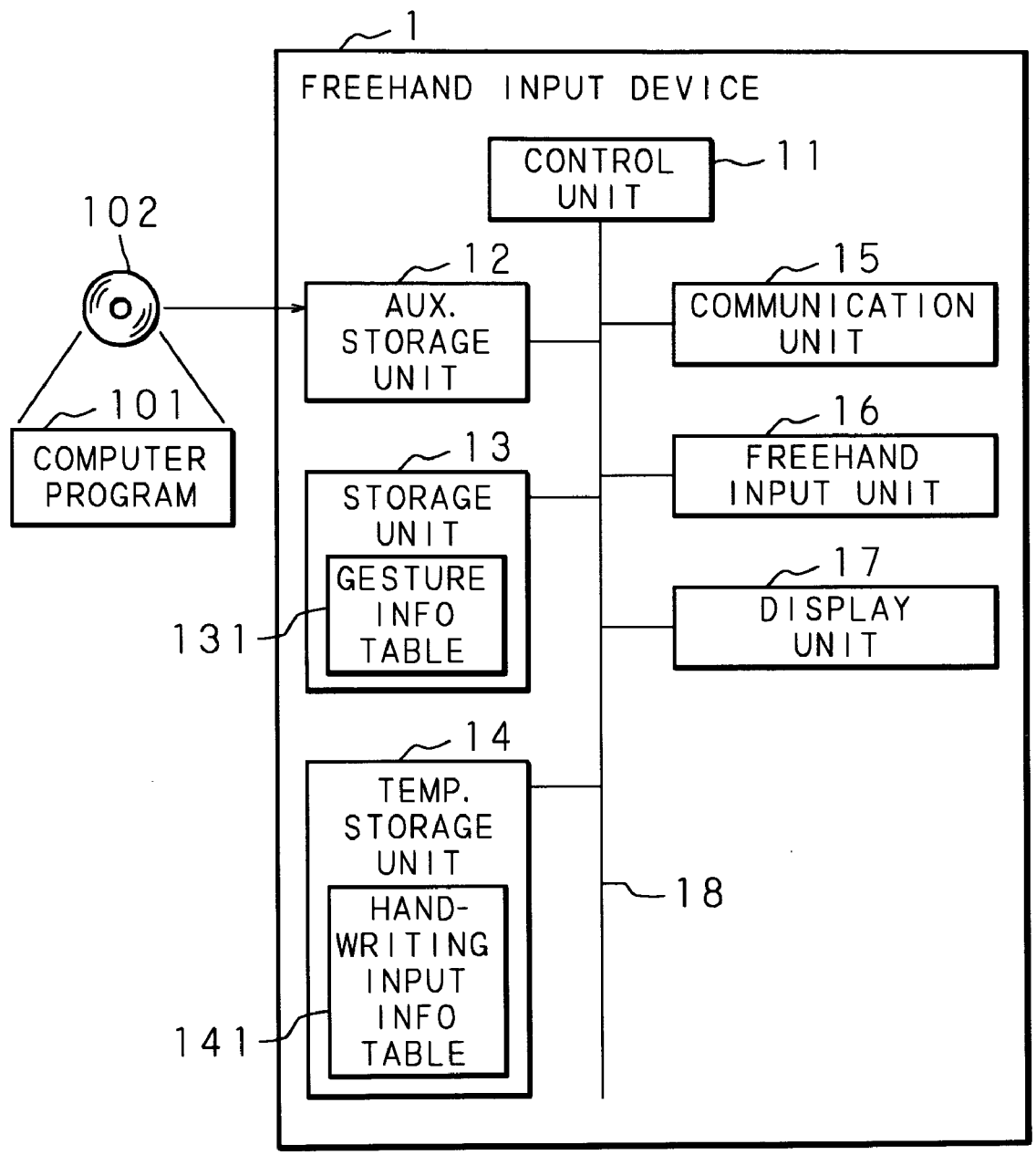
FIG. 1 is a block diagram showing a configuration of a freehand input device in accordance with a first embodiment of the present invention.

FIG. 1 is a block diagram showing a configuration of a freehand input device 1 for performing a freehand input method in accordance with a first embodiment of the present invention. In the first embodiment and a second embodiment described later, the freehand input device 1 of the present invention is achieved using a general purpose computer.

The freehand input device 1 has a control unit 11 such as a CPU for controlling the whole device, an auxiliary storage unit 12 such as CD-ROM drive for reading various information from a recording medium 102 such as a CD-ROM for recording various information such as a computer program 101 which can be run in the freehand input device 1 in accordance with the first embodiment of the present invention and data, and a storage unit 13 such as a hard disc for storing the various information read by the auxiliary storage unit 12 therein. Thus, under control of the control unit 11, by reading the computer program 101 and various information such as data from the storage unit 13, storing the various information in a temporary storage unit 14 such as a RAM for temporarily storing information therein and executing various procedures contained in the computer program 101, the general purpose computer performs the freehand input method of the present invention and operates as the freehand input device 1 of the present invention.

The storage unit 13 also stores a gesture information table 131 described later in an appropriate region. The temporary storage unit 14 sets a handwriting input information table 141 described later in an appropriate region each time the computer program 101 is executed, that is, the freehand input device 1 of the present invention is activated. However, both of the gesture information table 131 and the handwriting input information table 141 may be set in the storage unit 13 or the temporary storage unit 14 by executing the computer program by the control unit 11 each time the freehand input device 1 of the present invention is activated.

The freehand input device 1 further has a communication unit 15 for performing data communications with the outside, a handwriting input unit 16 and a display unit 17 such as a monitor. The handwriting input unit 16 is formed integral with the display unit 17. The handwriting input unit 16 accepts handwriting input and gesture input to an image displayed on the display unit 17 and sends the accepted input to the control unit 11 via an internal bus 18. Specifically, the handwriting input unit 16 can be formed of a combination of a stylus pen and a transparent tablet superimposed on the display screen of the display unit 17 or have a configuration for inputting freehand characters by operating a cursor displayed on the display screen of the display unit 17 by use of a pointing device such as a mouse. The control unit 11 acquires the input accepted by the handwriting input unit 16 as a coordinate value on the display screen of the display unit 17. Thus, the control unit 11 functions as a coordinate value acquisition unit (coordinate value acquiring means).

Figure 2:
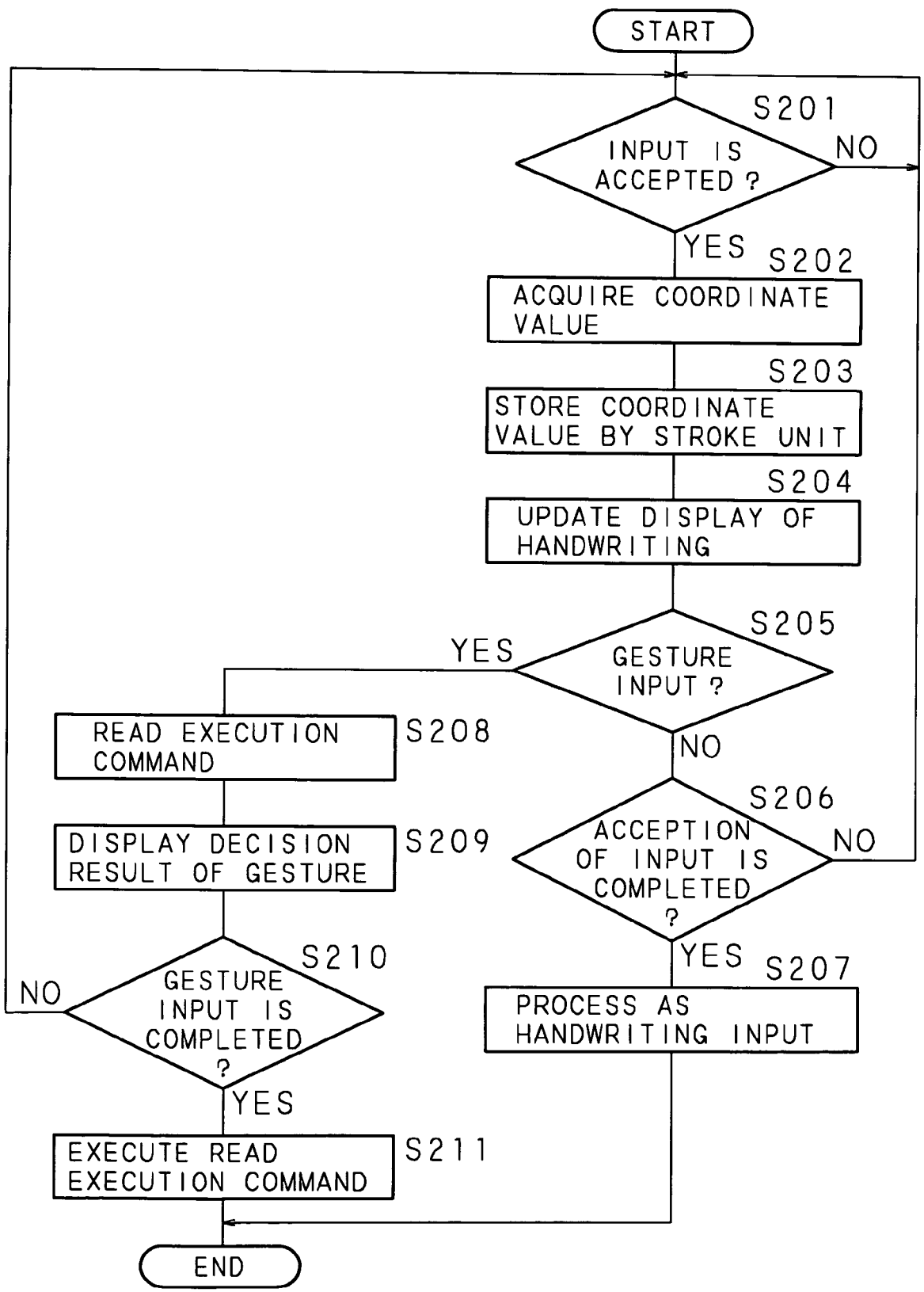
FIG. 2 is a flowchart showing procedure for handwriting input processing of a control unit in the freehand input device in accordance with the first embodiment of the present invention.

FIG. 2 is a flowchart showing procedure for handwriting input processing of the control unit 11 in the freehand input device 1 in accordance with the first embodiment of the present invention. As described above, the following processing procedure is executed by the control unit 11 according to the computer program stored in the storage unit 13.

The control unit 11 of the freehand input device 1 decides whether or not handwriting input is accepted (step S201) and keeps a waiting state until the handwriting input is accepted (step S201: NO). When it is decided that the handwriting input is accepted (step S201: YES), the control unit 11 acquires a coordinate value of the accepted handwriting input on the display screen of the display unit 17 (step S202) and stores the acquired coordinate value in the temporary storage unit 14 in units of stroke (step S203). The coordinate values of one stroke mean a group of consecutive coordinates from a pen-down point to a pen-up point on the display screen of the display unit 17. Hereinafter, the coordinate values of one stroke are referred to as handwriting input information. The control unit 11 updates the handwriting display on the display unit 17 on the basis of the acquired coordinate values (step S204).

FIG. 3 is a schematic view showing an example of handwriting input information stored in the handwriting input information table 131 set in the storage unit 13 of the freehand input device 1 in accordance with the first embodiment of the present invention.

In the first embodiment, a handwriting ID as information for identifying handwriting is given to each input handwriting. For each handwriting ID, a coordinate value at a pen-down position on the display screen of the display unit 17, a coordinate value which is acquired by a predetermined sampling cycle from pen down on the display screen and a coordinate value at a pen-up position on the display screen are stored in the temporary storage unit 14 as one record of handwriting input information. When handwriting is displayed on the display screen, the handwriting is interpolated by spline interpolation or the like on the basis of each sampled coordinate value and the interpolated handwriting is displayed. As a matter of course, by making a sampling cycle shorter, straight-line approximation between adjacent coordinates may be displayed. In any case, as described above, handwriting from the pen-down point to the pen-up point can be displayed on the display screen, that is, updated.

Next, the control unit 11 decides whether or not the handwriting input thus accepted is gesture input (step S205). A method for deciding whether or not the handwriting input is gesture input at the step S205 is not specifically limited. In the first embodiment, for example, it is decided whether or not the handwriting input is gesture input depending on whether or not the handwriting input has acute angles of a certain number or more. For example, a substantially close curve is repeatedly inputted a predetermined number of times or more, a closed region is filled, any handwriting is acceptable as long as it can be decided.

Figure 4:
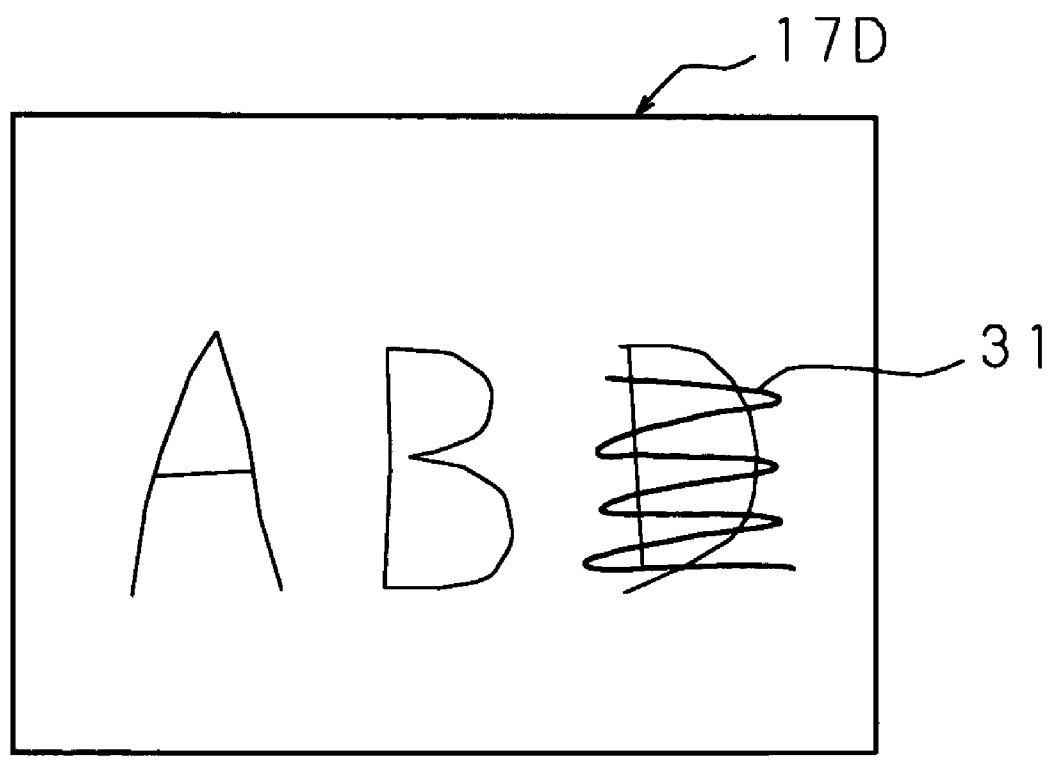
FIG. 4 is a schematic view showing display state of a display screen of a display unit in the case where freehand characters are inputted.

FIG. 4 is a schematic view showing display state of a display screen 17D of the display unit 17 in the case where freehand characters "ABD" are inputted. In an example shown in FIG. 4, to delete a character "D" after inputting of "ABD" by handwriting input, the user inputs a zigzag line 31 by handwriting. Such zigzag line 31 includes a plurality of bending portions bending at an acute angle. When such zigzag line 31 is inputted, the control unit 11 calculates the number of bending portions on the basis of the coordinate values of handwriting from pen-down.

Figure 5:
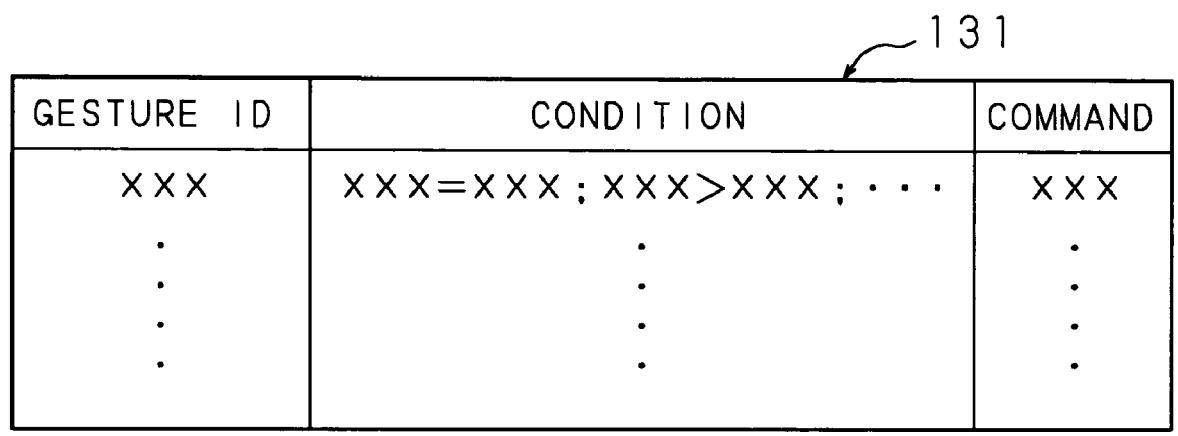
FIG. 5 is a schematic view showing an example of data structure of a gesture information storage unit stored in the storage unit of the freehand input device in accordance with the first embodiment of the present invention.

In the storage unit 13, conditions for deciding gesture input are stored as a form of the gesture information table 131 therein. FIG. 5 is a schematic view showing an example of data structure of the gesture information table 131 as a gesture information storage unit stored in the storage unit 13 of the freehand input device 1 in accordance with the first embodiment of the present invention.

The gesture information table 131 stores one or a plurality of conditions necessary for being decided as each gesture and an execution command corresponding to each gesture, which correspond to a gesture ID as information for identifying the type of gesture, as a set of gesture information.

When it is decided that handwriting input is not gesture input (step S205: NO), the control unit 11 decides whether or not acceptance of the handwriting input is completed (step S206). When it is decided that acceptance of the handwriting input is not completed (step S206: NO), the control unit 11 returns processing to the step S201 and repeats the above-mentioned processing. On the other hand, when it is decided that acceptance of the handwriting input is completed at the step S206 (step S206: YES), the control unit 11 processes the accepted handwriting input as normal handwriting input (step S207).

When it is decided that the handwriting input is gesture input at the step S205 (step S205: YES), the control unit 11 identifies the gesture ID representing the type of gesture which corresponds to the accepted handwriting input from the gesture information table 131 and reads the execution command corresponding to the identified gesture ID (step S208). Subsequently, the control unit 11 displays a decision result of the gesture on the display unit 17 (step S209). Then, the control unit 11 decides whether or not the gesture input is completed, that is, pen-up is performed (step S210).

When it is decided that gesture input is not completed (step S210: NO), the control unit 11 returns the process to the step S201 and repeats the above-mentioned processing.

Figure 6A:
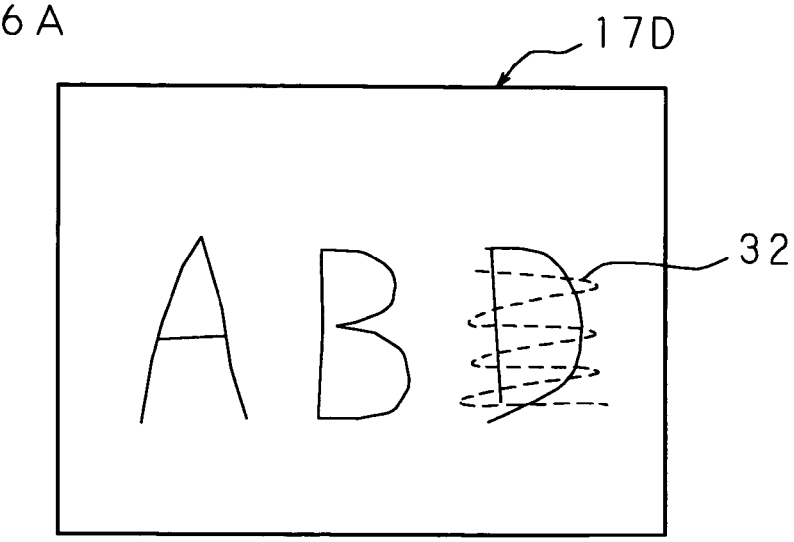
FIG. 6A, FIG. 6B and FIG. 6C are exemplary views showing display state in the case where it is decided that a solid zigzag line inputted on the display screen on which the freehand characters are displayed is gesture input.

FIG. 6A is a schematic view showing display state of the display screen 17D of the display unit 17 in the case where the control unit 11 decides that the solid zigzag line 31 additionally inputted on the display screen 17D of the display unit 17 on which the freehand characters "ABD" are displayed as shown in FIG. 4 is gesture input. As shown in FIG. 6A, when the control unit 11 decides that the solid zigzag line 31 is gesture input, at this time, the control unit 11 updates the solid zigzag line 31 to a broken zigzag line 32 and displays the broken zigzag line 32.

In this manner, even during gesture input, at the time when it is decided that gesture is inputted, the fact that the input is decided as gesture input is displayed. Thereby, the user can visually recognize that the device decides the input as gesture input. Therefore, in the case where the user intends to execute a command by inputting gesture, the user can recognize that handwriting input need not be continued since the solid zigzag line 31 is updated to the broken zigzag line 32. Thus, the user completes handwriting input, that is, by performing pen-up, a desirable command can be executed without making unnecessary handwriting input.

Figure 7A:
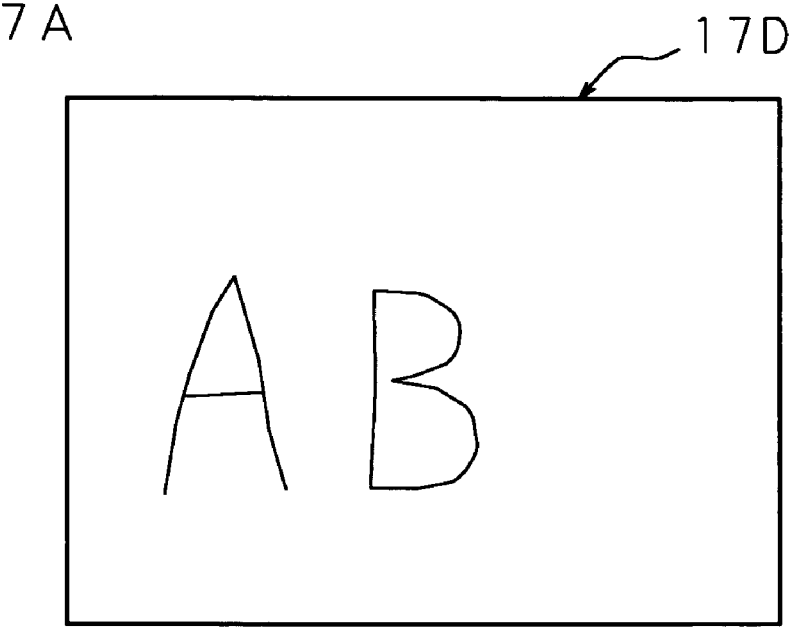
FIG. 7A and FIG. 7B are schematic views showing display state in the case where a command is executed by performing pen-up on the display screen on which freehand characters are inputted.

FIG. 7A is a schematic view showing display state in the case where a command is executed by performing pen-up on the display screen 17D of the display unit 17 on which freehand characters "ABD" are displayed.

An example shown in FIG. 7A shows the case where a command executed by gesture input is deletion of already inputted handwriting data crossing the inputted gesture. Specifically, by performing pen-up, gesture input is completed, a command corresponding to the inputted gesture is executed and a freehand character "D" crossing the gesture is deleted.

A method of displaying the fact that gesture is inputted is not limited to updating the solid line to the broken line as shown in FIG. 6A. For example, display of handwriting decided as gesture may be turned on and off. In this case, if the cycle of turning on and off may be changed depending on the type of gesture, the user can visually recognize which command is executed.

Alternatively, for example, display color of handwriting decided as gesture may be changed. For example, normal handwriting input may be displayed in "black" and handwriting decided as gesture input may be displayed in another color such as "red". Furthermore, for example, if display color of handwriting decided as gesture input is changed depending on the type of gesture, the user can visually recognize which command is executed.

Figure 6B:
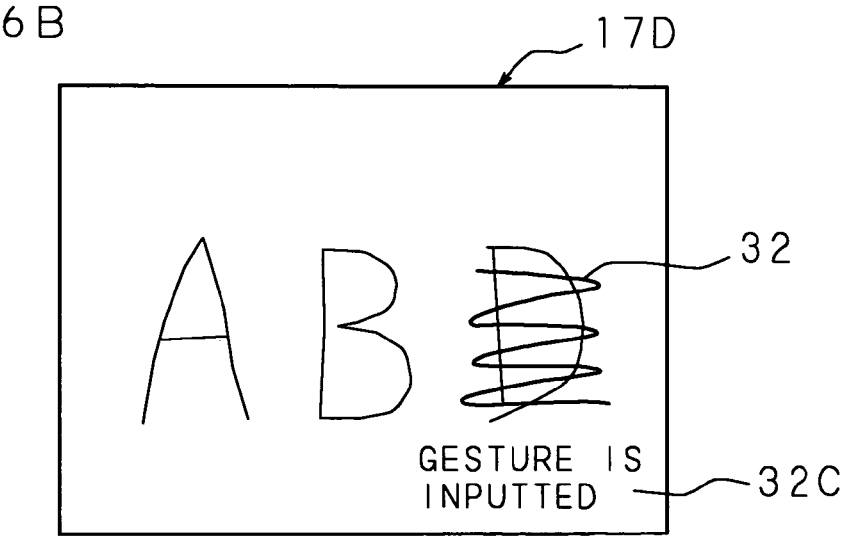

Furthermore, as shown in FIG. 6B, text data 32C representing that gesture is inputted may be displayed in the vicinity of the display position of the handwriting decided as gesture on the display screen 17D of the display unit 17. In this case, by corresponding the content of the displayed text data 32C to the type of gesture, the user can visually recognize which command will be executed.

Figure 6C:
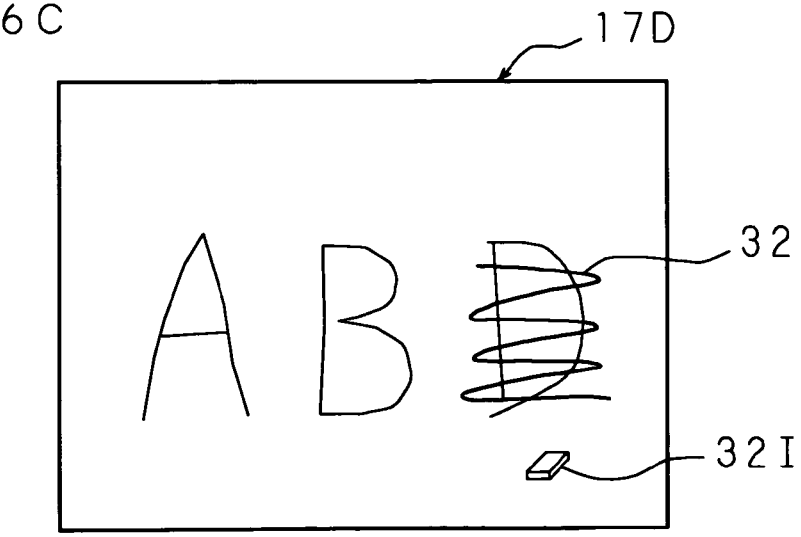

Furthermore, as shown in FIG. 6C, an icon 32I representing that gesture is inputted may be displayed in the vicinity of the display position of the handwriting decided as gesture on the display screen 17D of the display unit 17. In this case, by corresponding a pattern of the displayed icon 32I to the type of gesture, the user can visually recognize which command will be executed. In an example shown in FIG. 6C, an icon having a pattern like an "eraser" is displayed.

Furthermore, the shape of a cursor instructing handwriting (gesture) displayed on the display screen 17D of the display unit 17 may be changed. For example, a general pen-type cursor may be displayed until the input is decided as gesture input and an eraser-type cursor may be displayed after the input is decided as gesture input. As a matter of course, by corresponding the shape of the displayed cursor to the type of gesture, the user can visually recognize which command will be executed.

When it is decided that gesture input is completed (step S210: YES), the control unit 11 executes the execution command read in advance from the gesture information table 131 (step S211). Thereby, the user can execute the command corresponding to the gesture at the timing when the input is decided as gesture input, that is, gesture input is stopped.

In the first embodiment described above, even before gesture input is completed, when handwriting during inputting is decided as gesture input, the fact that the input is decided as gesture input is displayed. Thus, since the user can visually recognize that gesture is inputted, the command corresponding to gesture can be executed without continuing unnecessary gesture input.

Second Embodiment

Even when inputted handwriting is decided as gesture input in the above-mentioned first embodiment, when handwriting input of gesture is not made for a certain period after that, it may be decided that the input is not gesture input. That is, when the control unit 11 of the freehand input device 1 wrongly decides that gesture is inputted despite that the user does not intend to input gesture, more specifically, the user finds wrong decision by display representing that the input is decided as gesture input, preferably, the user can cancel the wrong decision by using a predetermined operation. Also, when the user cancels gesture input on the way despite that he/she starts inputting gesture according to his/her intent, usability is improved by performing cancellation without any specific operation for cancellation.

Hereinafter, a second embodiment will be described. The above-mentioned first embodiment is different from the below-described second embodiment only in processing procedure by the control unit 11. Since configuration of the freehand input device 1 and other elements are common, description thereof is omitted.

Figure 8:
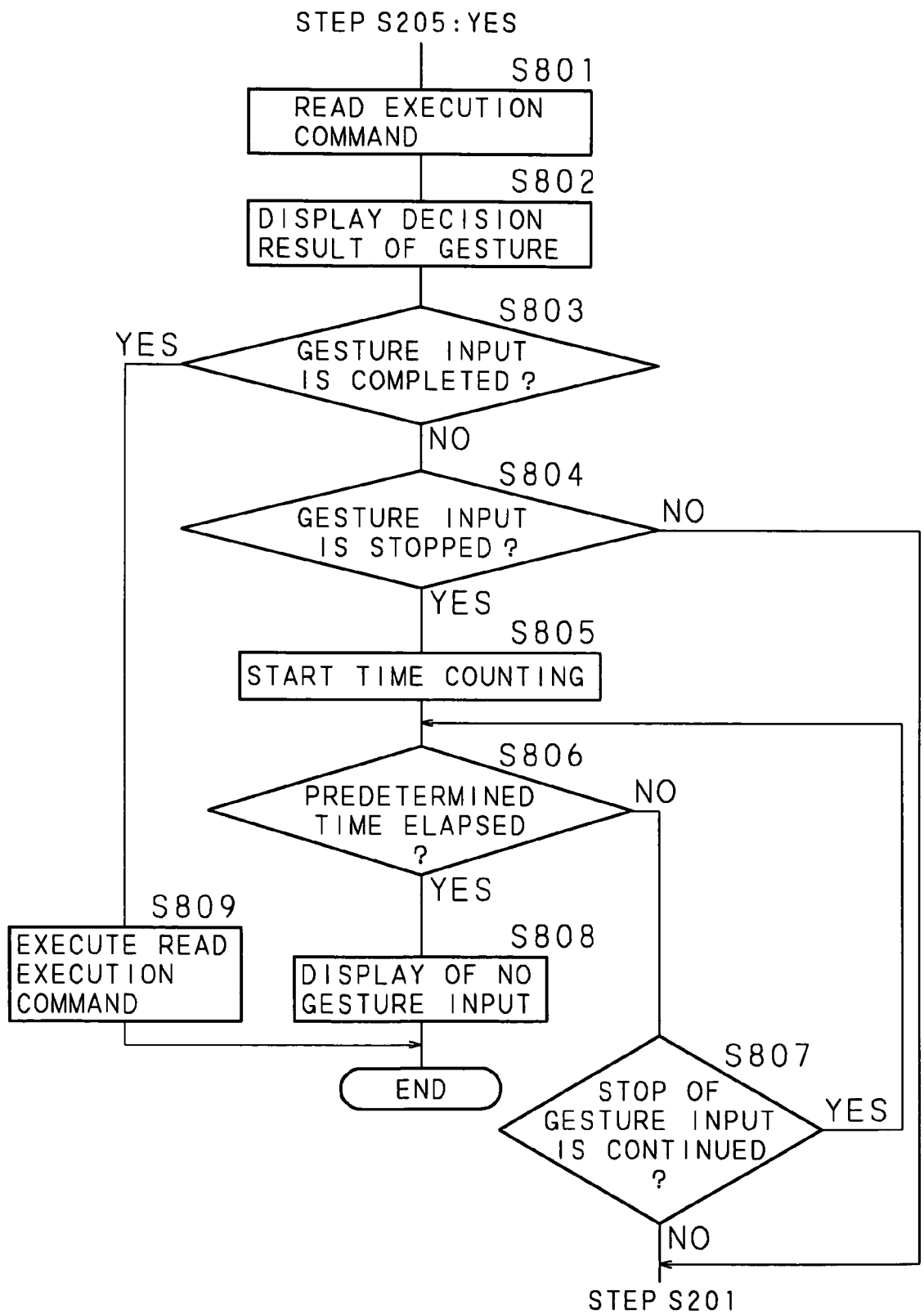
FIG. 8 is a flowchart showing processing procedure by the control unit of the freehand input device in accordance with a second embodiment of the present invention in the case of gesture input.

FIG. 8 is a flowchart showing processing procedure by the control unit 11 of the freehand input device 1 in accordance with the second embodiment of the present invention. The flowchart shown in FIG. 8 only shows processing procedure following decision of gesture input at the step S205 of control procedure by the control unit 11 in the first embodiment shown in FIG. 2. Proceeding procedure prior to the step S205 in the second embodiment is the same as that in the first embodiment.

When the control unit 11 of the freehand input device 1 decides that inputted handwriting is gesture input (step S205: YES), the control unit 11 identifies the gesture ID representing the type of gesture which meets the condition for the accepted handwriting from the gesture information table 131 and reads an execution command corresponding to the identified gesture ID (step S801). Subsequently, the control unit 11 displays gesture decision result on the display unit 17 (step S802). Then, the control unit decides whether or not gesture input is completed, that is, pen-up is performed (step S803).

When it is decided that gesture input is not completed (step S803: NO), the control unit 11 decides whether or not gesture input is stopped (step S804). Whether or not gesture input is stopped can be decided depending on whether or not handwriting input is updated without performing pen-up.

When it is decided that gesture input is not stopped (step S804: NO), the control unit 11 returns processing to the step S201. In this case, the user intentionally continues gesture input.

On the other hand, when it is decided that gesture input is stopped (step S804: YES), the control unit 11 starts processing after time counting is reset once using an internal timer and the like (step S805) to decide whether or not predetermined time is elapsed (step S806). When it is decided that predetermined time is not elapsed (step S806: NO), the control unit 11 decides whether or not stoppage of gesture input continues (step S807).

When it is decided that stoppage of gesture input continues (step S807: YES), the control unit 11 returns processing to the step S806. On the other hand, when it is decided that stoppage of gesture input does not continue (step S807: NO), the control unit 11 returns processing to the step S201.

When it is decided that the predetermined time is elapsed while stoppage of gesture input continues (step S806: YES), the control unit 11 updates the decision result whether or not the input is gesture input displayed on the display screen 17D of the display unit 17 to display representing that the input is not gesture input (step S808). In this case, the user does not intend gesture input.

Figure 9:
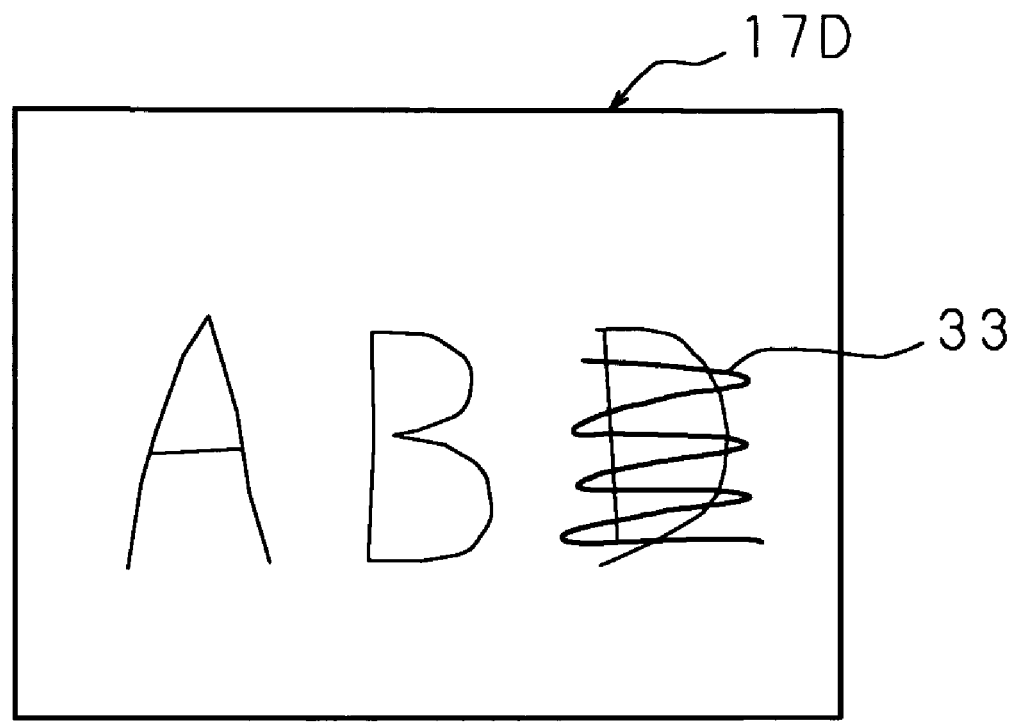
FIG. 9 is a view showing the state where a broken zigzag line representing that the input is decided as gesture input on the display screen on which freehand characters are inputted is updated to a solid zigzag line.

FIG. 9 is a schematic view showing the state where the broken zigzag line 32 representing that the input is decided as gesture input on the display screen 17D of the display unit 17 on which freehand characters "ABD" are inputted as shown in, for example, FIG. 6A is updated to the solid zigzag line 33 like the zigzag line 31 as shown in FIG. 4 before the input is decided as gesture input. By waiting for a predetermined time without performing pen-up in this manner, the user can obtain the same effects as in the case where an operation meaning that the input is not gesture input. Thus, when the input is wrongly decided as gesture input, the user can prevent execution of the execution command corresponding to the wrongly decided gesture. Furthermore, when the input is wrongly decided as gesture input, the user can prevent execution of the execution command previously corresponding to the wrongly decided gesture. Moreover, when the input is decided as gesture despite that the user stops gesture input on the way, the decided gesture can be canceled without performing any specific operation.

When it is decided that gesture input is completed (step S803: YES), the control unit 11 executes the execution command read in advance from the gesture information table 131 (step S809). Thus, the user can make the device execute the command corresponding to the gesture at the timing when it is recognized that the input is decided as gesture input, that is, gesture input is stopped.

Third Embodiment

When it is decided that the input handwriting is gesture input, at the time when it is decided that gesture input is completed, an icon for instructing cancellation of the execution command may be displayed for a predetermined time in the vicinity of the position where the command is executed by the gesture inputted on the display screen 17D of the display unit 17. That is, the user who does not intend gesture input performed pen-up by mistake, and thus, the execution command may be executed. However, for example, even when the handwriting input which the user does not intend to delete is deleted by execution of the execution command, by the user's operation of selecting the icon displayed for a predetermined time as described above, the handwriting input deleted once can be restored.

A third embodiment as described above will be described hereinafter. The above-mentioned first and second embodiments are different from the below-described third embodiment only in processing procedure by the control unit 11. Since configuration of the freehand input device 1 and other elements are common, description thereof is omitted.

Figure 10:
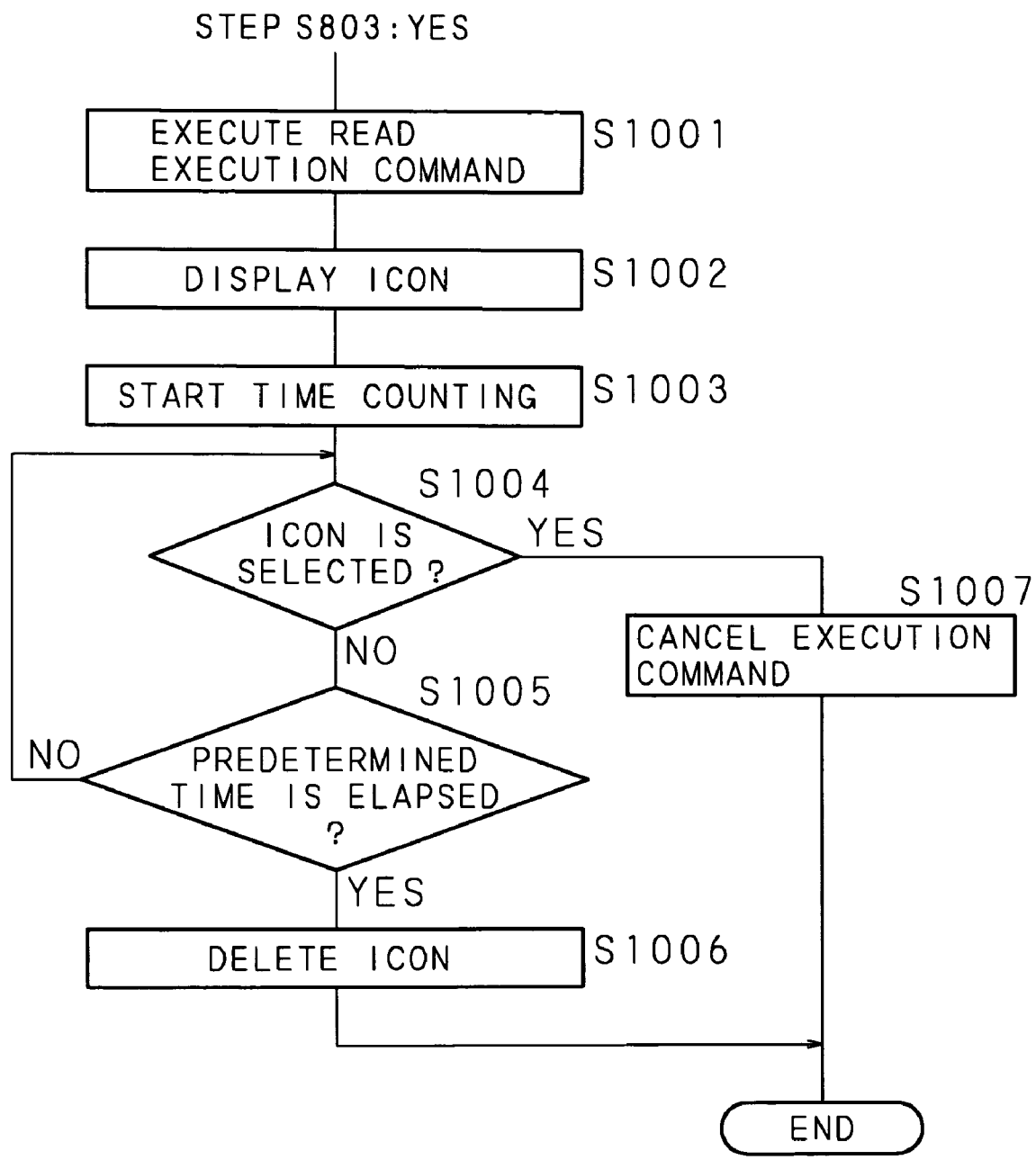
FIG. 10 is a flowchart showing procedure of restoration processing by the control unit of the freehand input device in accordance with the second embodiment of the present invention when gesture input is completed.

FIG. 10 is a flowchart showing procedure of restoration processing by the control unit 11 of the freehand input device 1 in accordance with the third embodiment of the present invention after gesture input is completed. The flowchart shown in FIG. 10 shows only processing procedure after it is decided that gesture input is completed at the step S803 in the flowchart shown in FIG. 8.

When the control unit 11 of the freehand input device 1 decides that gesture input is completed (step S803: YES), the control unit 11 executes the execution command read in advance from the gesture information table 131 (step S1001) and displays an icon for accepting an instruction to cancel the executed command on the display screen 17D of the display unit 17 (step S1002). The control unit 11 starts time counting after reset once using an internal timer or the like (step S1003).

Figure 7B:
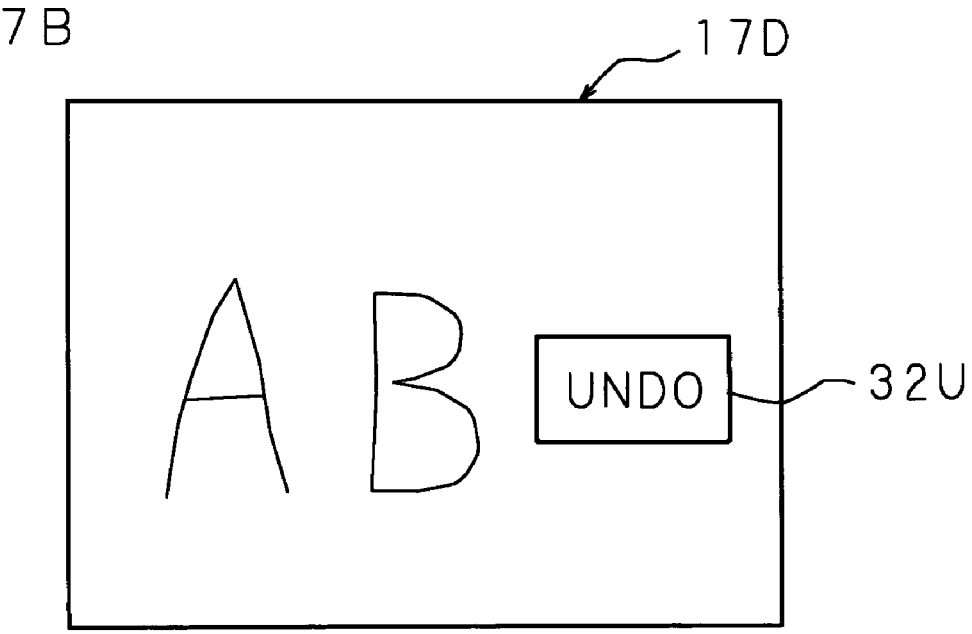

Through the above-mentioned processing, as shown in, for example, FIG. 7A, when a freehand character "D" crossing gesture is deleted, as shown in FIG. 7B, an icon 32U "UNDO" for undoing the executed command is displayed on the display screen 17D of the display unit 17.

The control unit 11 decides whether or not the operation of selecting the displayed icon 32U as described above (step S1004). When it is decided that the icon 32U is not selected (step S1004: NO), the control unit 11 decides whether or not a predetermined time is elapsed (step S1005).

When it is decided that the predetermined time is not elapsed (step S1005: NO), the control unit 11 returns processing to the step S1004 and repeats the above-mentioned processing. On the other hand, when it is decided that the predetermined time is elapsed while the icon 32U is not selected (step S1005: YES), the control unit 11 deletes the displayed icon 32U on the display screen 17D of the display unit 17 (step S1006). In this case, the user does not intend to cancel the execution command executed by gesture.

When it is decided that the icon 32U is selected (step S1004: YES), the control unit 11 cancels the execution command executed by gesture which causes the selected icon 32U to be displayed (step S1007). Specifically, for example, when the execution command intended by the user is a command to delete handwriting crossing gesture, as shown in FIG. 9, handwriting and gesture are restored and displayed on the display screen 17D of the display unit 17. In this case, when the handwriting input is not decided as gesture according to processing intended by the user, or despite that the handwriting input is decided as gesture according to processing intended by the user, the user stops processing on the way.

In the above-mentioned third embodiment, by selecting the icon, even when gesture input is completed, the user can easily cancel the decision that the gesture is inputted. Thus, the user can display the handwriting input decided once as gesture on the display screen 17D of the display unit 17 again without executing the command corresponding to the gesture.

As has been described in detail, according to the first aspect of the present invention, even before gesture input is completed, at the time when the input is decided as gesture input, the fact is displayed. Accordingly, since the user can visually confirm that the input is decided as gesture input, the command stored in accordance to the gesture can be executed without continuing unnecessary gesture input.

According to the second aspect of the present invention, as a matter of course, when handwriting input assigned to gesture is made, the input is decided as gesture. However, when the handwriting input is left non-updated for a predetermined time after the fact that the input is decided as gesture input is displayed, it is controlled so that the command corresponding to the gesture decided as being input may not be executed. For example, when updated display or display data of handwriting input crossing handwriting of a sign "x" is set to be deleted according to a command by inputting a sign "x" over the character already inputted by handwriting as gesture, the user may left standing for a predetermined time in the state where color display of sign "x" is updated. With such configuration, handwriting input of the sign "x" can be accepted as normal handwriting, not gesture without deleting handwriting input.

According to the third aspect of the present invention, by selecting an icon, even after gesture input is completed, the user can easily cancel the decision that the input is gesture. Thus, handwriting input can be displayed on the display screen without executing the command corresponding to gesture.

According to the other aspects of the present invention, the user can visually confirm that the input is decided as gesture input. Accordingly, handwriting input according to the user's intent can be made without performing the operation of mode switching by continuing handwriting input or completing gesture input.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A method for making a program cause a computer to function as a handwriting input device which comprises: a table for storing execution commands corresponding to types of gestures therein; a display unit having a display screen; a handwriting input unit for accepting handwriting input including gesture input; and a coordinate value acquisition unit for acquiring coordinate values of the handwriting input accepted by said handwriting input unit, wherein the display unit displays handwriting corresponding to handwriting input including the gesture accepted by said handwriting input, said method comprising the steps of:

deciding whether or not said handwriting input unit is accepting handwriting input;

updating display data of handwriting when it is decided that said handwriting input unit is accepting handwriting input;

deciding whether or not said handwriting input is gesture input when it is decided that the accepting of handwriting input in said handwriting input unit is not completed;

deciding whether or not the accepting of handwriting input in said handwriting input unit is completed;

deciding the type of gesture on the basis of the coordinate values acquired by said coordinate value acquisition unit when it is decided that the handwriting input is gesture input;

reading an execution command corresponding to the decided type of gesture from said table;

displaying on said display unit the fact that the input is gesture input;

deciding whether or not gesture input is completed; and executing the execution command corresponding to said gesture input when it is decided that gesture input is completed;

deciding whether or not coordinate values acquired by said coordinate value acquisition unit are constant;

deciding whether or not the state where it is decided that the coordinate values keep constant for a predetermined time when input is decided as gesture input;

changing decision result to the result that the input is not gesture input when it is decided the predetermined time is elapsed; and updating display on said display screen of said display unit to display showing the fact that the input is not gesture input.

2. A method for making a program cause a computer to function as a handwriting input device which comprises: a table for storing execution commands corresponding to types of gestures therein; a display unit having a display screen; a handwriting input unit for accepting handwriting input including gesture input; and a coordinate value acquisition unit for acquiring coordinate values of the handwriting input accepted by said handwriting input unit, wherein the display unit displays handwriting corresponding to handwriting input including the gesture accepted by said handwriting input, said method comprising the steps of:

deciding whether or not said handwriting input unit is accepting handwriting input;

updating display data of handwriting when it is decided that said handwriting input unit is accepting handwriting input;

deciding whether or not said handwriting input is gesture input when it is decided that the accepting of handwriting input in said handwriting input unit is not completed;

deciding whether or not the accepting of handwriting input in said handwriting input unit is completed;

deciding the type of gesture on the basis of the coordinate values acquired by said coordinate value acquisition unit when it is decided that the handwriting input is gesture input;

reading an execution command corresponding to the decided type of gesture from said table;

displaying on said display unit the fact that the input is gesture input;

deciding whether or not gesture input is completed; and executing the execution command corresponding to said gesture input when it is decided that gesture input is completed;

displaying a predetermined icon in the vicinity of position where gesture was inputted on said display screen of said display unit when the input is decided as gesture input and it is decided that gesture input is completed;

deciding whether or not the icon displayed on said display screen of said display unit is selected;

changing decision result to the result that the input is not gesture input when it is decided that the icon displayed on said display screen of said display unit is selected; and updating display on said display screen of said display unit to display showing the fact that the input is not gesture input.

3. The method as set forth in claim 1, wherein handwriting displayed corresponding to handwriting input on said display screen of said display unit is blinked.

4. The method as set forth in claim 3, wherein a blinking cycle of handwriting corresponding to handwriting input decided as gesture on said display screen of said display unit is changed depending on the decided type of gesture.

5. The method as set forth in claim 1, wherein handwriting corresponding to handwriting input decided as gesture is displayed on said display screen of said display unit in a color other than the color of the handwriting input decided as non-gesture input.

6. The method as set forth in claim 5, wherein display color of handwriting corresponding to handwriting input decided as gesture on said display screen of said display unit is changed depending on the decided type of gesture.

7. The method as set forth in claim 1, wherein text data representing that input is decided as gesture input is displayed in the vicinity of display position of handwriting corresponding to handwriting input decided as gesture on said display screen of said display unit.

8. The method as set forth in claim 7, wherein the text data is changed depending on the decided type of gesture.

9. The method as set forth in claim 1, wherein an icon representing that input is decided as gesture input is displayed in the vicinity of display position of handwriting corresponding to handwriting input decided as gesture on said display screen of said display unit.

10. The method as set forth in claim 9, wherein said icon is changed depending on the decided type of gesture.

11. A method for making a program cause a computer to function as a handwriting- input device which comprises: a table for storing execution commands corresponding to types of gestures therein; a display unit having a display screen; a handwriting input unit for accepting handwriting input including gesture input; and a coordinate value acquisition unit for acquiring coordinate values of the handwriting input accepted by said handwriting input unit, wherein the display unit displays handwriting corresponding to handwriting input including the gesture accepted by said handwriting input, said method comprising the steps of:

deciding whether or not said handwriting input unit is accepting handwriting input;

updating display data of handwriting when it is decided that said handwriting input unit is accepting handwriting input;

deciding whether or not said handwriting input is gesture input when it is decided that the accepting of handwriting input in said handwriting input unit is not completed;

deciding whether or not the accepting of handwriting input in said handwriting input unit is completed;

deciding the type of gesture on the basis of the coordinate values acquired by said coordinate value acquisition unit when it is decided that the handwriting input is gesture input;

reading an execution command corresponding to the decided type of gesture from said table;

displaying on said display unit the fact that the input is gesture input;

deciding whether or not gesture input is completed; and executing the execution command corresponding to said gesture input when it is decided that gesture input is completed;

wherein a cursor for instructing handwriting corresponding to handwriting input decided as gesture on said display screen of said display unit is changed so as to have different shape of a cursor in the case of the input decided as non-gesture input.

12. The method as set forth in claim 11, wherein pattern of said cursor is changed depending on the decided type of gesture.

13. A freehand input device which comprises: storing means for storing execution commands corresponding to types of gestures; displaying means having a display screen; freehand inputting means for accepting handwriting input including gesture input; and coordinate value acquiring means for acquiring coordinate values of handwriting input accepted by said freehand inputting means, wherein the display unit displays handwriting corresponding to handwriting input including the gesture accepted by said freehand inputting means, said device comprising:

first deciding means for deciding whether or not said freehand inputting means is accepting handwriting input;

handwriting display updating means for updating display data of handwriting when said first deciding means decides that said freehand inputting means is accepting handwriting input;

second deciding means for deciding whether or not the handwriting input is gesture input when it is decided that accepting of handwriting input is said handwriting input is not completed;

third deciding means for deciding whether or not the accepting of handwriting input in said handwriting input is completed;

deciding means for deciding the type of gesture on the basis of the coordinate values acquired by said coordinate value acquiring means when said third deciding means decides the handwriting input is gesture input;

means for reading an execution command corresponding to the type of gesture decided by said deciding means;

gesture decision displaying means for displaying the fact that the handwriting input is gesture input on said display screen of said displaying means thereon;

fourth deciding means for deciding whether or not gesture input is completed;

coordinate value deciding means for deciding whether or not coordinate values acquired by said coordinated value acquiring means are constant; and fifth deciding means for deciding whether or not the state where said coordinate value deciding means decides that the coordinate values keep constant for a predetermined time when said second deciding means decides that the handwriting input is gesture input;

wherein the execution command corresponding to the gesture input is executed when said second deciding means decides that gesture input is completed, said second deciding means changes decision result to the result that the handwriting input is not gesture input when said fifth deciding means decides that the predetermined time is elapsed, and said gesture decision displaying means updates display on said display screen of said displaying means to display showing that the handwriting input is decided as non-gesture input.

14. A freehand input device which comprises: storing means for storing execution commands corresponding to types of gestures; displaying means having a display screen; freehand inputting means for accepting handwriting input including gesture input; and coordinate value acquiring means for acquiring coordinate values of handwriting input accepted by said freehand inputting means, wherein the display unit displays handwriting corresponding to handwriting input including the gesture accepted by said freehand inputting means, said device comprising:

first deciding means for deciding whether or not said freehand inputting means is accepting handwriting input;

handwriting display updating means for updating display data of handwriting when said first deciding means decides that said freehand inputting means is accepting handwriting input;

second deciding means for deciding whether or not the handwriting input is gesture input when it is decided that accepting of handwriting input is said handwriting input is not completed;

third deciding means for deciding whether or not the accepting of handwriting input in said handwriting input is completed;

deciding means for deciding the type of gesture on the basis of the coordinate values acquired by said coordinate value acquiring means when said third deciding means decides the handwriting input is gesture input;

means for reading an execution command corresponding to the type of gesture decided by said deciding means;

gesture decision displaying means for displaying the fact that the handwriting input is gesture input on said display screen of said displaying means thereon;

fourth deciding means for deciding whether or not gesture input is completed; wherein the execution command corresponding to the gesture input is executed when said- second deciding means decides that gesture input is completed;

icon displaying means for displaying a predetermined icon in the vicinity of position where gesture is inputted on said display screen of said displaying means when said third deciding means decides that handwriting input is decided as gesture input and said fourth deciding means decides that gesture input is completed; and sixth deciding means decides whether or not the icon displayed by said icon displaying means is selected;

wherein said third deciding means changes decision result to the result that handwriting input is not gesture input when said sixth deciding means decides that the icon is selected, and said gesture decision displaying means updates display on said display screen of said displaying means to display showing that the handwriting input is not gesture input.

15. A freehand input device which comprises: a table for storing execution commands corresponding to types of gestures; a display unit having a display screen; a freehand input unit for accepting handwriting input including gesture input; and a controller for displaying handwriting corresponding to handwriting input including the gesture accepted by said freehand input unit by acquiring coordinate values of handwriting input accepted by said freehand input unit, wherein
said controller further capable of performing the following operations of,
deciding whether or not said handwriting input unit is accepting handwriting input;
updating display data of handwriting when it is decided that said handwriting input unit is accepting handwriting input;
deciding whether or not said handwriting input is gesture input when it is decided that accepting of handwriting input in said handwriting input unit is not completed;
deciding whether or not the accepting of handwriting input in said handwriting input is completed;
deciding the type of gesture on the basis of coordinate values on said display screen when it is decided that said handwriting input is gesture input;
reading an execution command corresponding to the decided type of gesture from said table;
displaying the fact that the handwriting input is gesture input on said display screen of said display unit;
deciding whether or not gesture input is completed;
executing the execution command corresponding to the gesture input when it is decided that gesture input is completed;
deciding whether or not coordinated values of gesture on said display screen of said display unit are constant;
deciding whether or not the state where coordinate value keep constant for a predetermined time when it is decided that the handwriting input is gesture input;
changing decision result to the result that handwriting input is not gesture input when it is decided that the predetermined time is elapsed; and
updating display on said display screen of said display unit to display showing that the handwriting input is not gesture input.

16. A freehand input device which comprises: a table for storing execution commands corresponding to types of gestures; a display unit having a display screen; a freehand input unit for accepting handwriting input including gesture input; and a controller for displaying handwriting corresponding to handwriting input including the gesture accepted by said freehand input unit by acquiring coordinate values of handwriting input accepted by said freehand input unit, wherein
said controller further capable of performing the following operations of,
deciding whether or not said handwriting input unit is accepting handwriting input;
updating display data of handwriting when it is decided that said handwriting input unit is accepting handwriting input;
deciding whether or not said handwriting input is gesture input when it is decided that accepting of handwriting input in said handwriting input unit is not completed;
deciding whether or not the accepting of handwriting input in said handwriting input is completed;
deciding the type of gesture on the basis of coordinate values on said display screen when it is decided that said handwriting input is gesture input;
reading an execution command corresponding to the decided type of gesture from said table;
displaying the fact that the handwriting input is gesture input on said display screen of said display unit;
deciding whether or not gesture input is completed;
executing the execution command corresponding to the gesture input when it is decided that gesture input is completed;
wherein said controller is further capable of the following operations:
displaying a predetermined icon in the vicinity of position where gesture is inputted on said display screen of said display unit when handwriting input is decided as gesture input and it is decided that gesture input is completed;
deciding whether or not the icon displayed on said display screen of said display unit is selected;
changing decision result to the result that handwriting input is not gesture input when it is decided that the icon displayed on said display screen of said display unit is selected; and
updating display on said display screen on said display unit to display showing that the handwriting input is not gesture input.

17. A computer program product for controlling a computer which is connected to: a table for storing execution commands corresponding to types of gestures; a display unit having a display screen; and a freehand input unit for accepting handwriting input including gesture input, wherein the display unit displays handwriting corresponding to handwriting input including the gesture accepted by said handwriting input unit by acquiring coordinate values of handwriting input accepted by said handwriting input unit, said computer program product comprises:
a non-transirory computer readable storage medium having computer readable program code means embodied in the medium, the computer readable program code means comprising computer instruction means for:
deciding whether or not said handwriting input unit is accepting handwriting input;
updating display data of handwriting when it is decided that said handwriting input unit is accepting handwriting input;
deciding whether or not the handwriting input is gesture input when it is decided that the accepting of handwriting input in said handwriting input unit is not completed;
deciding whether or not the accepting of handwriting input in said handwriting input unit is completed;
deciding the type of gesture on the basis of coordinate values on said display screen of said display unit when it is decided that the handwriting input is gesture input;
reading an execution command corresponding to the decided type of gesture from said table;
displaying the fact that the handwriting input is gesture input on said display screen of said display unit;
deciding whether or not gesture input is completed;
executing the execution command corresponding to the gesture input when it is decided that gesture input is completed;
deciding whether or not coordinate values of gesture on said display screen of said display unit are constant;

deciding whether or not the state where coordinated values keep constant for a predetermined time when it is decided that the handwriting input is gesture unput;

changing decision result to the result that handwriting input is not gesture input when it is decided that the predetermined time is elapsed; and updating display on said display screen of said display unit to display showing that the handwriting input is not gesture input.

18. A computer program product for controlling a computer which is connected to: a table for storing execution commands corresponding to types of gestures; a display unit having a display screen; and a freehand input unit for accepting handwriting input including gesture input, wherein the display unit displays handwriting corresponding to handwriting input including the gesture accepted by said handwriting input unit by acquiring coordinate values of handwriting input accepted by said handwriting input unit, said computer program product comprises:

a non-transirory computer readable storage medium having computer readable program code means embodied in the medium, the computer readable program code means comprising computer instruction means for:

deciding whether or not said handwriting input unit is accepting handwriting input;

updating display data of handwriting when it is decided that said handwriting input unit is accepting handwriting input;

deciding whether or not the handwriting input is gesture input when it is decided that the accepting of handwriting input in said handwriting input unit is not completed;

deciding whether or not the accepting of handwriting input in said handwriting input unit is completed;

deciding the type of gesture on the basis of coordinate values on said display screen of said display unit when it is decided that the handwriting input is gesture input;

reading an execution command corresponding to the decided type of gesture from said table;

displaying the fact that the handwriting input is gesture input on said display screen of said display unit;

deciding whether or not gesture input is completed;

executing the execution command corresponding to the gesture input when it is decided that gesture input is completed;

displaying a predetermined icon in the vicinity of position where gesture is inputted on said display screen of said display unit when handwriting input is decided as gesture input and it is decided that gesture input is completed;

deciding whether or not the icon displayed on said display screen of said display unit is selected;

changing decision result to the result that handwriting input is not gesture input when it is decided that the icon displayed of said display screen of said display unit is selected; and updating display on said display screen on said display unit to display showing that the handwriting input is not gesture input.

* * * * *